US005674635A

United States Patent [19]

Hsieh et al.

[11] Patent Number: 5,674,635

[45] Date of Patent: Oct. 7, 1997

[54] ELECTROLUMINESCENT DEVICE

[75] Inventors: Bing R. Hsieh; Gordon E. Johnson; Kathleen M. McGrane, all of Webster; Milan Stolka, Fairport, all of N.Y.

[73] Assignee: Xerox Corporation, Stamford, Conn.

[21] Appl. No.: 313,963

[22] Filed: Sep. 28, 1994

[51] Int. Cl.$^6$ .............................. B32B 7/00; H05B 33/12; B05D 5/12

[52] U.S. Cl. .......................... 428/690; 428/917; 428/412; 428/447; 428/450; 428/458; 428/480; 313/502; 313/504; 313/506; 427/64; 427/66

[58] Field of Search .................................... 428/690, 704, 428/917, 412, 447, 448, 450, 458, 480; 427/64, 66, 240; 313/502, 503, 504, 506

[56] References Cited

U.S. PATENT DOCUMENTS

| | | | |
|---|---|---|---|
| 4,356,429 | 10/1982 | Tang | 313/503 |
| 4,769,292 | 9/1988 | Tang et al. | 428/690 |
| 4,806,443 | 2/1989 | Yanus et al. | 430/56 |
| 4,806,444 | 2/1989 | Yanus et al. | 430/56 |
| 4,818,650 | 4/1989 | Limburg et al | 430/56 |
| 4,950,950 | 8/1990 | Perry et al. | 313/504 |
| 5,030,532 | 7/1991 | Limburg et al. | 430/56 |
| 5,073,446 | 12/1991 | Scozzafava et al. | 428/323 |
| 5,206,103 | 4/1993 | Stolka et al. | 430/59 |
| 5,231,329 | 7/1993 | Nishikitani et al. | 313/503 |
| 5,281,489 | 1/1994 | Mori et al. | 428/690 |
| 5,389,444 | 2/1995 | Hosokawa et al. | 428/457 |

FOREIGN PATENT DOCUMENTS

WO 90/13148 11/1990 WIPO .

OTHER PUBLICATIONS

T. S. Perry et al., "Computer Displays: New Choices, New Tradeoffs," *IEEE Spectrum*, vol. 23, No. 7, pp. 52–59, 1985.

L. E. Tannas et al., "Electroluminescence Catches the Public Eye," *IEEE Spectrum*, vol. 23, vol. 10, Oct. 1986, pp. 37–42.

L. E. Tannas et al., "Flat–panel Displays Displace Large, Heavy, Power–Hungry CRTs," vol. 26, No. 9, Sep. 1989, pp.34–35.

J. H. Burroughes et al., "Light–emitting Diodes Based on Conjugated Polymers," *Nature*, vol. 347, Oct. 11, 1990, pp. 539–541.

P. S. Vincett et al., "Electrical Conduction and Low Voltage Blue Electroluminescene in Vacuum–Deposited Organic Films," *Thin Solid Films*, 94 (1982) pp. 171–183.

R. H. Partridge, "Electroluminescence from Polyvinylcarbazole Films: 4. Electroluminescence Using Higher Work Function Cathodes," *Polymer*, 1983, vol. 24, Jun. pp. 755–762.

D. Braun et al., "Visible Light Emission from Semiconducting Polymer Diodes," *Appl. Phys. Lett.*, 58(18), May 6, 1991, pp. 1982–1984.

D. Braun et al., "Improved Efficiency in Semiconducting Polymer Light–Emitting Diodes," *Journal of Electronic Materials*, vol. 20, No. 11, 1991, pp. 945–948.

A. R. Brown et al., "Poly(p–phenylenevinylene) Light–emitting Diodes: Enhanced Electroluminescent Efficiency Through Charge Carrier Confinement," *Appl. Phys. Lett.* 61 (23), Dec. 7, 1992, pp. 2793–2795.

J. Kido et al., "Poly(methylphenysilane) Film as a Hole Transport Layer in Electroluminescent Devices," *Appl. Phys. Letter*, 59 (21), Nov. 18, 1991, pp. 2760–2762.

Y. Ohmori et al., "Visible–Light Electroluminescent Diodes Utilizing Poly(3–alkylthiophene)," *Japanese Journal of Applied Physics*, vol. 30, No. 11B, Nov., 1991, pp. 1938–1940.

(List continued on next page.)

*Primary Examiner*—Patrick Ryan
*Assistant Examiner*—Marie R. Yamnitzky
*Attorney, Agent, or Firm*—Oliff & Berridge

[57] ABSTRACT

An electroluminescent (EL) device includes a polymeric tetraaryl substituted biphenyldiamine.

18 Claims, 1 Drawing Sheet

OTHER PUBLICATIONS

Y. Ohmori et al., "Blue Electroluminescent Diodes Utilizing Poly(alkylfluorene)," *Japanese Journal of Applied Physics,* vol. 30, No. 11B, Nov., 1991, pp. 1941–1943.

R. H. Friend et al., "Photo-excitation in Conjugated Polymers," *J. Phys. D: Appl. Phys.,* 20 (1987), pp. 1367–1384.

C. Hosokawa et al., "Bright Blue Elecroluminescence from Hole Transporting Polycarbonate," *Appl. Phys. Lett.,* 61 (2), Nov. 23, 1992, pp. 2503–2505.

N. C. Greenham et al., "Efficient Light-emitting Diodes Based on Polymers With High Electron Affinities," *Nature,* vol. 365, Oct. 14, 1993, pp. 628–630.

D. Bloor, "Totally Organic Transistors," *Nature,* vol. 349, Feb. 28, 1991, pp. 738–740.

F. Garnier et al., "An All-Organic Soft Thin Film Transistor With Very High Carrier Mobility," *Adv. Mater.,* 2 (1990) No. 12, pp. 592–594.

C. W. Tang et al., "Electroluminescence of Doped Organic Thin Films," *J. Appl. Phys.,* 65 (9), May 1, 1989, pp. 3610–3616.

C. Adachi et al., "Confinement of Charge Carriers and Molecular Excitons Within 5-nm-thick Emitter Layer in Organic Electroluminescent Devices with a Double Heterostructure," *Appl. Phys. Lett.,* 57 (6), Aug. 6, 1990, pp. 531-533.

ELECTROLUMINESCENT DEVICE

BACKGROUND OF THE INVENTION

This invention is directed to organic electroluminescent devices (EL). More specifically, the invention is directed to an EL device comprising a polymeric aryl tetra-substituted biphenyldiamine.

BACKGROUND

Electrooptical devices such as cathode ray tubes (CRT's) are known. These devices are large and consume substantial amounts of energy. Efforts have been devoted to replacing CRT's with flat panel devices that consume less energy, and operate at low voltages, for example 4–20 volts, and that are easily addressed by an array of thin film transistors such as illustrated by T. S. Perry and P. Wallick, IEEE Spectrum 22 No. 7, 52 (1985); L. E. Tannas, Jr., IEEE Spectrum 23 No. 10, 37 (1986); and L. E. Tannas, Jr., IEEE Spectrum 26 No. 9, 34 (1989).

Electroluminescent flat panel displays based on inorganic materials are known, however such displays require high driving voltages. Further known is the fabrication of organic electroluminescent devices such as those based on poly(p-phenylene vinylene), J. H. Burroughes et al., Nature 347, 539 (1990).

U.S. Pat. No. 4,950,950 to Perry et al. shows a multilayer EL device with silane hole transporting agents. U.S. Pat. No. 4,356,429 to Tang illustrates organic EL cells with a hole injecting porphyrinic zone. P. S. Vincett, W. A. Barlow, R. A. Hann and G. G. Roberts, Thin Solid Films 94, 171 (1982); R. H. Partridge, Polymer 24, 755 (1983); J. H. Burroughes et al., Nature, supra; D. Braun and A. J. Heeger, Applied Physics Letters 5–8, 1982 (1991); D. Braun and A. J. Heeger, J. Electronic Materials 20, 945 (1991); A. R. Brown et al., Applied Physics Letters 61, 2793 (1992); and J. Kido et al., Applied Physics Letters 59, 2760 (1991) disclose other organic EL compositions.

An organic EL device is formed with an organic emitting layer in a conductive contact with an anode, which is typically made of a transparent conductor such as indium-tin oxide, and a cathode, typically a low work-function metal such as magnesium or calcium.

In one configuration, the organic layer is comprised of a host polymer that supports hole injection from the anode and electron injection from the cathode, and is capable of emitting light in response to recombination of holes and electrons. This host polymer can further include a compound that facilitates hole injection, a compound that facilitates electron injection and, optionally, a fluorescent material capable of emitting light in response to recombination of holes and electrons.

In another configuration, the organic layer can comprise two separate layers, the one being adjacent to the anode supporting hole injection and transport and the one adjacent to the cathode supporting electron injection and transport. The recombination of charges and subsequent emission of light proceed in one of the layers but near the interface between the layers. Optionally, a fluorescent material can be added to one of the layers in which case the recombination of charges and emission of light proceed in that compound.

In yet another configuration, the organic layer comprises three separate layers; the hole transport layer, the emission layer and the electron transport layer.

U.S. Pat. No. 4,769,292 to Tang et al. teaches a preferred method of applying EL layers including applying the luminescent layer by vacuum phase deposition. Preferred active materials forming the organic luminescent layer are each capable of vacuum vapor deposition. Column 39, lines 25–43.

Vacuum phase deposition can degrade the performance of luminescent layers based on small molecules. Passage of current through the layers during formation of the EL, generates heat that induces crystallization. Crystallization degrades EL performance. Additionally, vacuum phase deposition limits the types of additives that can be incorporated into the luminescent layers. Vacuum phase deposition is a complicated and costly process requiring elevated temperatures and high vacuum.

R. H. Partridge, supra teaches a single layer EL device with poly(N-vinyl carbazole). While single layer organic devices are desirable, the devices known in the art are considered less efficient then multi-layer devices in luminescence, efficiency and life. Thus, Tang, supra proposes an EL device with a hole injecting zone between a luminescent zone and an anode as an improvement over devices with only a single layer luminescent zone.

J. H. Burroughes et al., Nature, supra teaches visible electroluminescence from conjugated polyphenylene vinylene (PPV). D. Braun and A. J. Heeger, Applied Physics Letters, supra teaches visible yellow electroluminescence from a soluble PPV derivative. Y. Ohmori et al., Jpn. J. Appl. Phys. 30, 1938 (1991) and Jpn. J. Appl. Phys. 30, 1941 (1991) disclose realization of red electroluminescence and blue electroluminescence. However, Friend et al., J. Phys. D. 20, 1367 (1987) discloses that the quantum efficiency of photoluminescence of PPV is less than 1%. Hosokawa et al., Appl. Phys. Lett. 61, 2503 (1992) concludes that it is difficult to obtain a highly efficient electroluminescence cell with a conjugated polyarylene vinylene such as PPV. Hosokawa et al. discloses an electroluminescent layer comprising a non-conjugated polymer of a polycarbonate styrylamine as a functional repeating unit.

The present invention is directed to a solution coated, economical EL device. The EL device of the present invention can be prepared to comprise a single organic layer. The device possesses excellent performance characteristics such as effective luminescence efficiency and extended life. The present invention provides a single layer organic device that is as good as a multilayer device with respect to luminance, efficiency and life. The EL emitter layer can be solution coated by known processes such as spin casting, dip coating, gravure coating and the like. Vacuum or vapor deposition is avoided. Solution coating avoids elevated temperatures and vacuum and permits easy coating of large areas and control of layer thickness. Another advantage is that other luminescent layer additives and emitter components can be selected that are soluble in the coating solution. Tuning emission color is easy since highly fluorescing compounds that cover the whole visible range are available.

SUMMARY OF THE INVENTION

The invention provides an EL device comprising a polymeric tetraaryl-substituted biphenyl diamine.

The present invention relates to an EL device that may be comprised of a hole transport component, electron transport component and a fluorescent component or emitter that emits light in response to an energy source. An embodiment of the present invention relates to an EL device comprised of a single active layer. The layer comprises a polymeric tetraaryl-substituted biphenyl diamine.

In embodiments, the present invention relates to an EL device that can be selected as a flat panel display device comprised of a supporting substrate, a hole injecting electrode, an electron injecting electrode and an single discrete emitter layer situated between the electrode components.

DESCRIPTION OF PREFERRED EMBODIMENTS

Illustrated in U.S. Pat. No. 4,769,292 to Tang et al., the disclosure of which is totally incorporated herein by reference, are multilayer EL devices with a luminescent zone of less than one micron in thickness comprising an organic host material and a fluorescent material and cathode and anode electrodes. Extensive examples of components selected for the devices of this patent are illustrated therein including host materials in columns 6 to 10, fluorescent dyes in columns 11 to 34, hole transport layers beginning in column 36, electron injecting and transporting compounds beginning in column 36, and the like.

In U.S. Pat. No. 5,073,446 to Scozafava et al., the disclosure of which is totally incorporated herein by reference, there is illustrated a multilayer organic electroluminescent device comprised of a support, an anode, an organic electroluminescent medium and a cathode comprised of an electron injecting layer.

Figure 1:
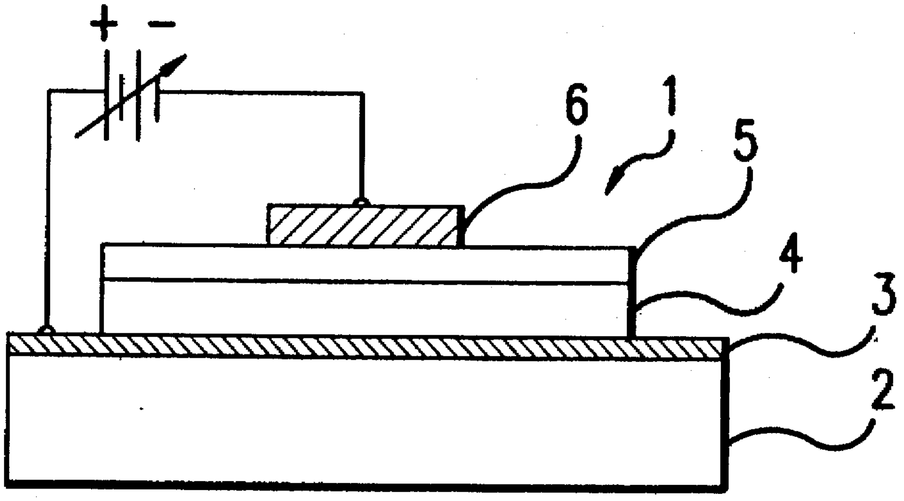
FIGS. 1 and 2 are schematic diagrams of EL devices.

FIG. 1 illustrates a device of the present invention. The EL device of FIG. 1 is a solution prepared solid state light emitting diode 1 comprised of a supporting substrate 2 of for example glass, an anode 3, a hole transport layer 4, layer 5 comprised of an electron transport layer and in contact therewith a low work function material as a metal cathode 6.

Figure 2:
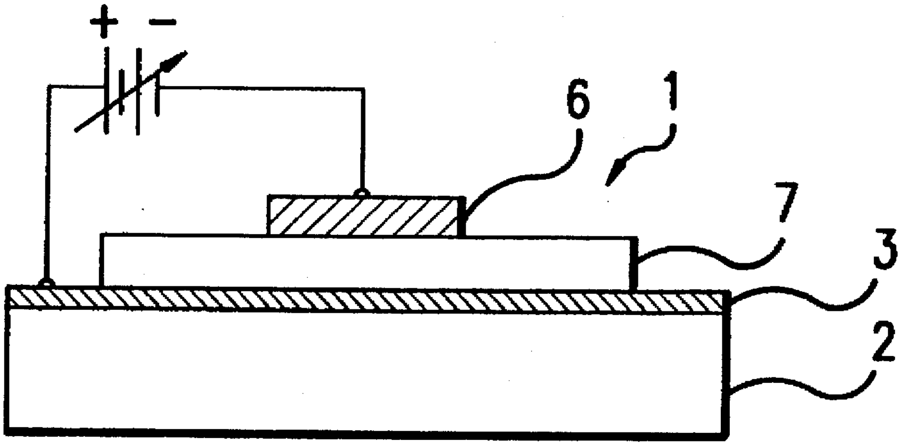

FIG. 2 illustrates another device of the present invention. In FIG. 2, elements identified with like numbers to the elements of FIG. 1 are the same elements as depicted in FIG. 1. The EL device of FIG. 2 is a single layer solution prepared solid state light emitting diode 1 comprised of supporting substrate 2, anode 3, cathode 6 and combined organic layer 7. In FIG. 2, the single layer 7 comprises a hole transport polymer (host material), an electron transport material and an emitter. The single layer 7 is solution coated using common techniques such as spin casting, dip coating, gravure coating, etc. instead of the usual techniques of applying EL layers by vapor deposition.

Illustrative examples of supporting substrate 2 include polymeric components, glass and the like and polyesters like Mylar®, polycarbonates, polyacrylates, polymethacrylates, polysulfones, quartz, gold, aluminum and the like. Other substrates can be selected provided they are essentially nonfunctional and can support the other layers. The thickness of the substrate can be from 25 to 1000 microns or more, as the the structural demands on the device may be.

Anode 3 contiguous to substrate 2, includes positive charge injecting electrodes such as indium tin oxide, tin oxide, gold, platinum, or other materials including conductive n-conjugated polymers such as polyaniline, polypyrrole etc., with a work function equal to, or greater than 4 electron volts. The thickness of the anode 3 can range from about 10 to 5000 Å with the preferred range dictated by the optical constants of the anode material.

The layer 4 comprises a polymeric tetraaryl-substituted biphenyl diamine compound. Suitable polymeric tetraaryl-substituted biphenyl diamine compounds as the emitter layer of the compositions of the invention are disclosed in U.S. Pat. Nos. 4,806,443 to Yanus et al., 4,806,444 to Yanus et al., 4,818,650 to Limburg et al. and 5,030,532 to Limburg et al. The disclosures of these patents are totally incorporated herein by reference.

Included among the suitable polymeric tetraaryl-substituted biphenyl diamine compounds are the polymeric reaction products of a tetra-substituted biphenyldiamine (TBD) represented by the following structure:

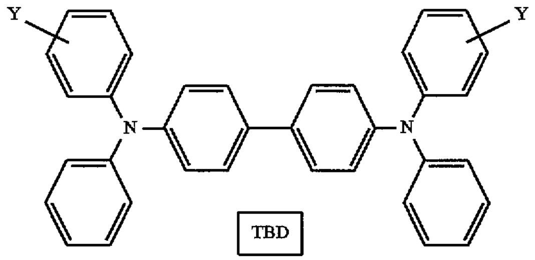

wherein Y is a reactive group such as hydroxy, epoxy, carboxyl, Iodo, bromo, or chloro group. The TBD forms poly(carbonates), poly(esters), poly(arylene ethers) and polysiloxanes of the following polymeric structures:

Poly(carbonates):

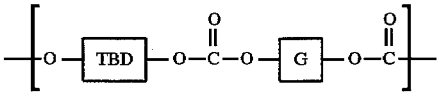

Poly(esters):

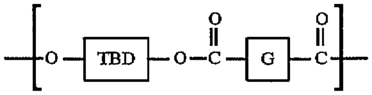

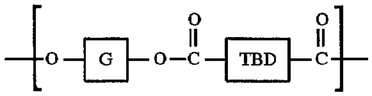

Polysiloxanes:

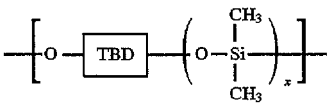

x = 1–6

Poly(arylene ethers):

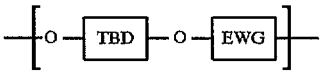

where G equals a hydrocarbon group or a heterocyclic group such as:

$-(CH_2)n-$, (n = 1–10); $-(CH_2CH_2O)n-$, (n = 1–6);
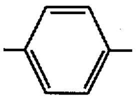 ; 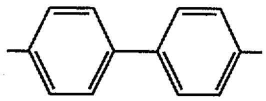 ; 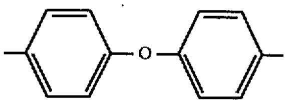
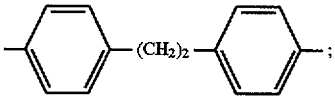 ; 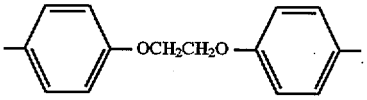
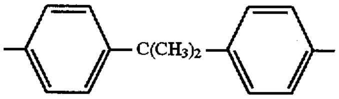 ; 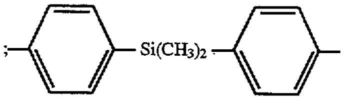
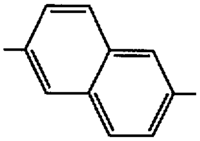 ; 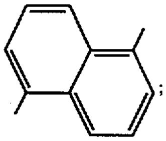 ; 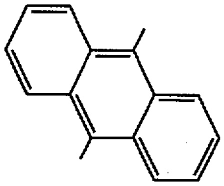
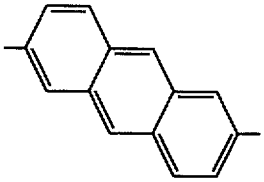 ; 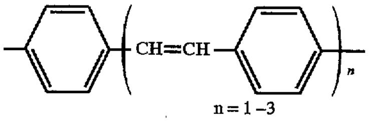
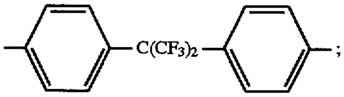 ; 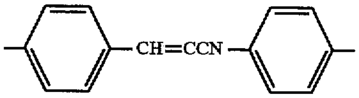
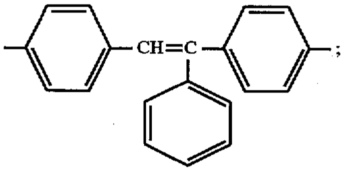 ; 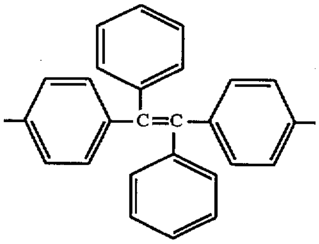
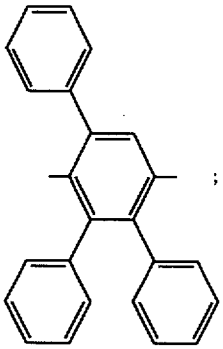 ; 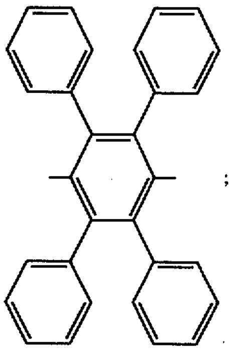 ; 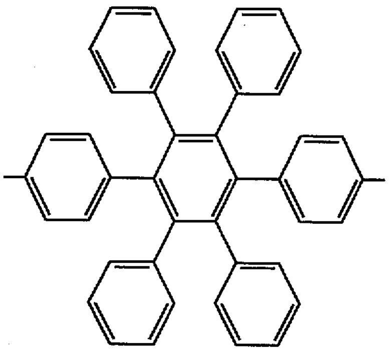
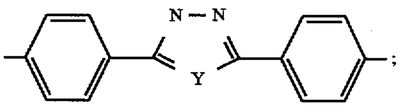 ; 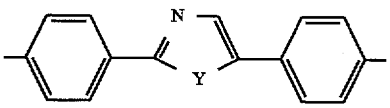

-continued
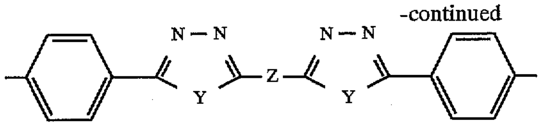
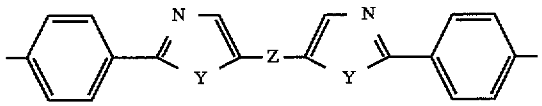
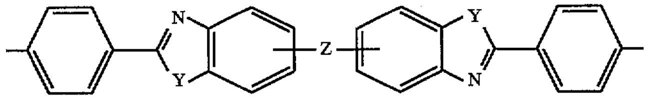
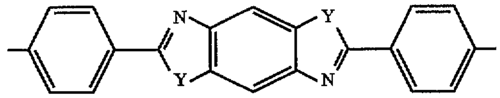 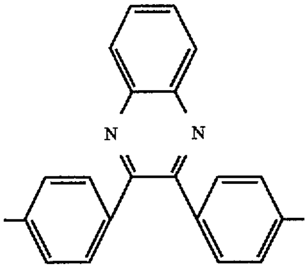
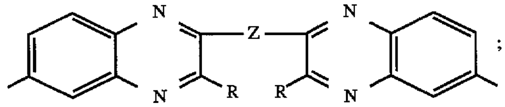 ; or
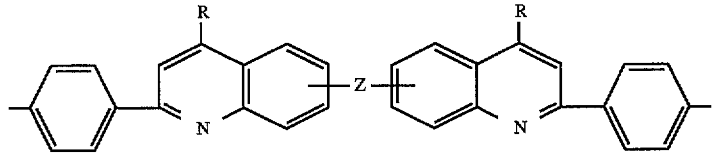
where R=Phenyl or alkyl groups; Y=S, O, N–R (R=alkyl, phenyl etc.); and Z=alkyl, phenylene etc. spacer groups. where EWG equals aromatic group moieties containing electron withdrawing groups such as:
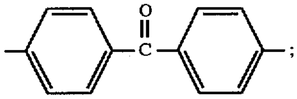 ; 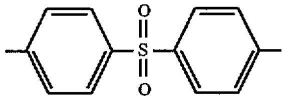
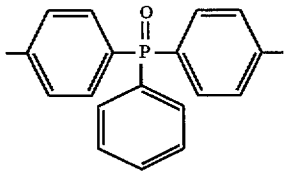 ; 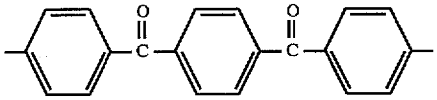

-continued
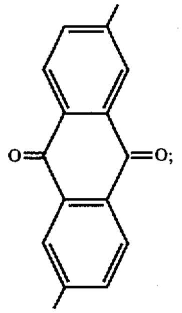
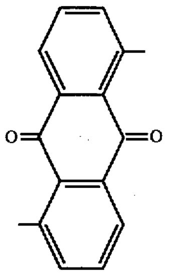
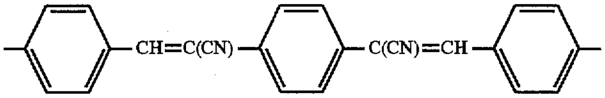
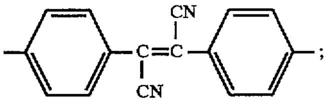
;
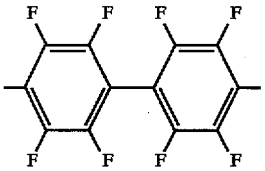
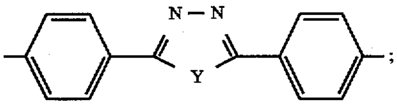
;
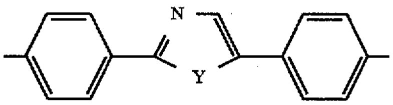
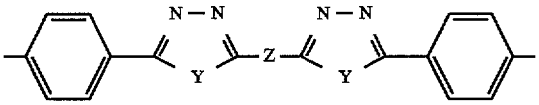
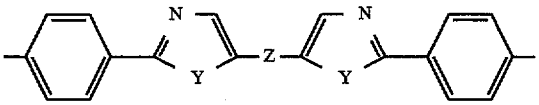
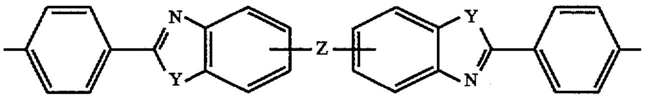
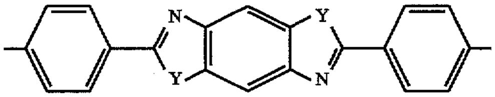
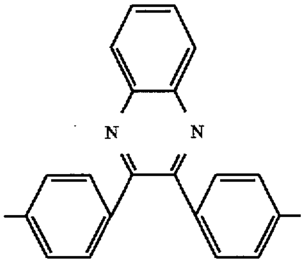
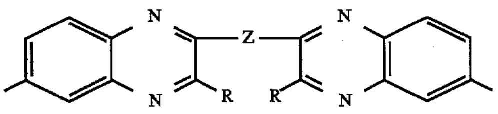

-continued
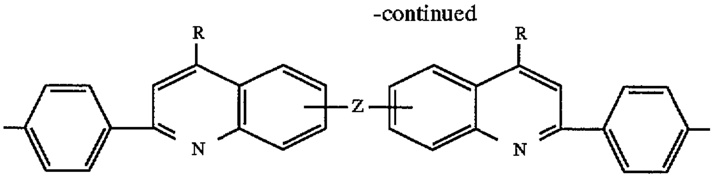
where R=Phenyl or alkyl groups; Y=S, O, N–R(R=alkyl, phenylene etc.); and Z=alkyl, phenylene etc. spacer groups.
Some exemplary poly(carbonates) include:
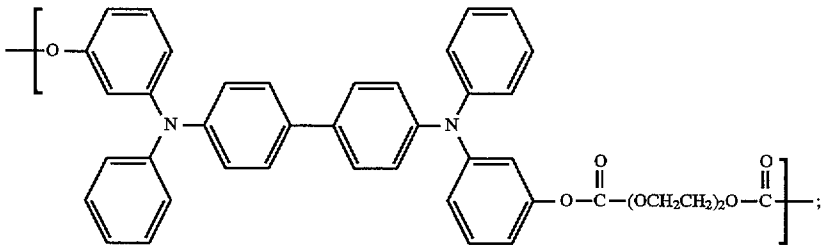
;
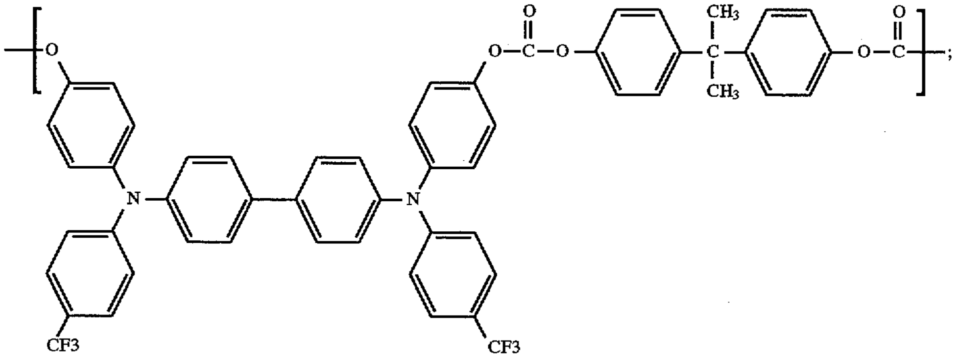
;
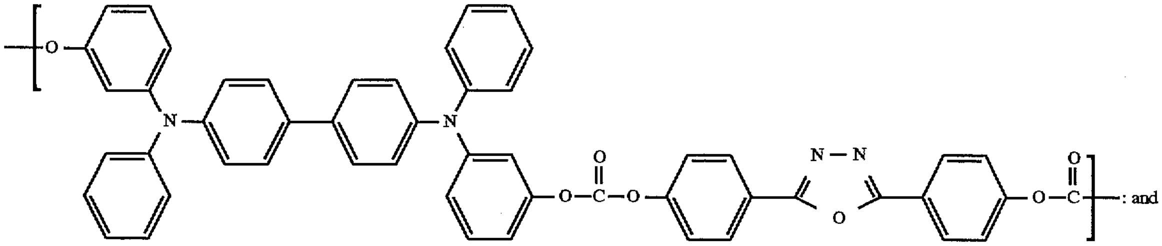
: and
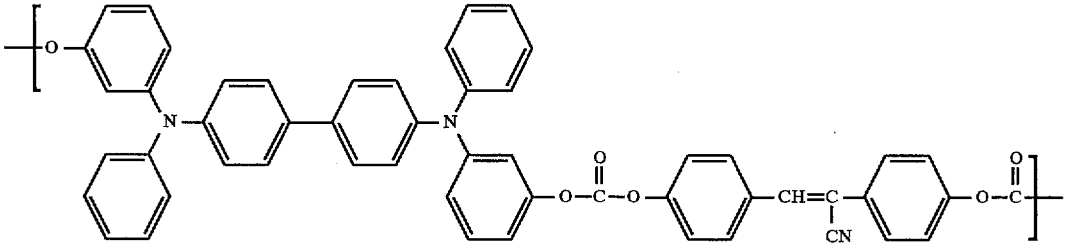
Some exemplary poly(esters) include:

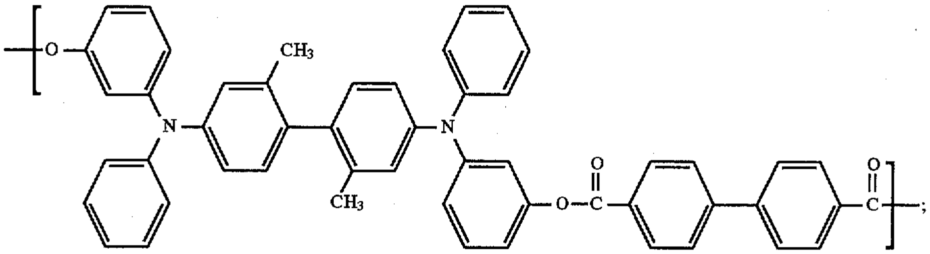
;
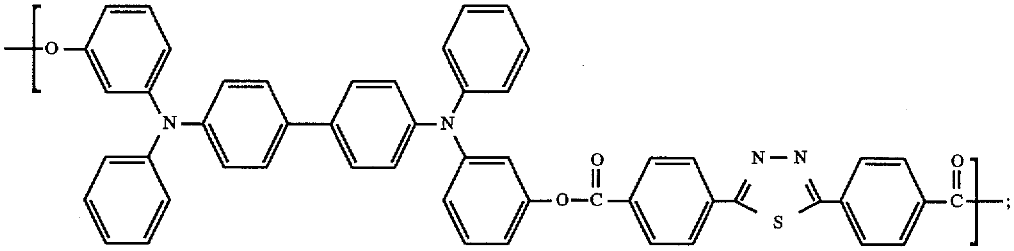
;
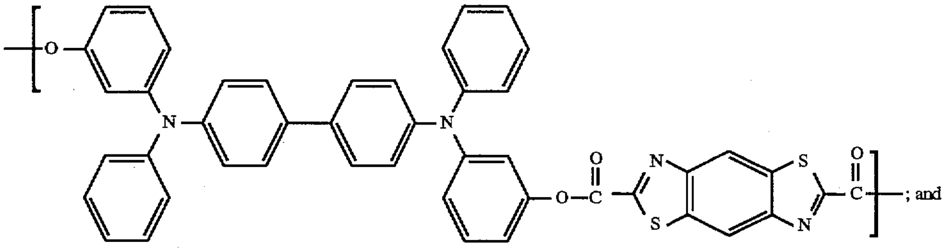
; and
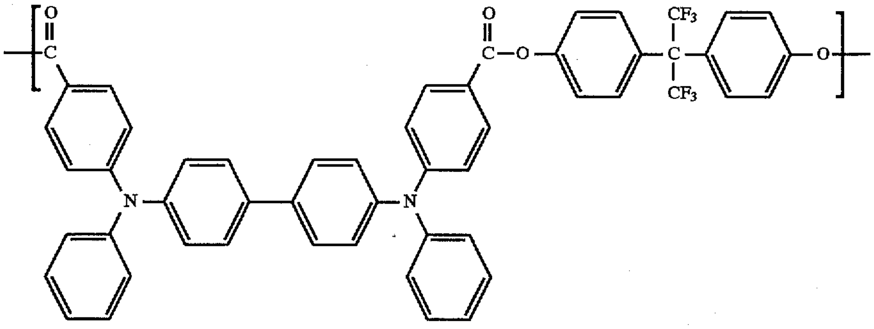
Some exemplary poly(arylene ethers) include:
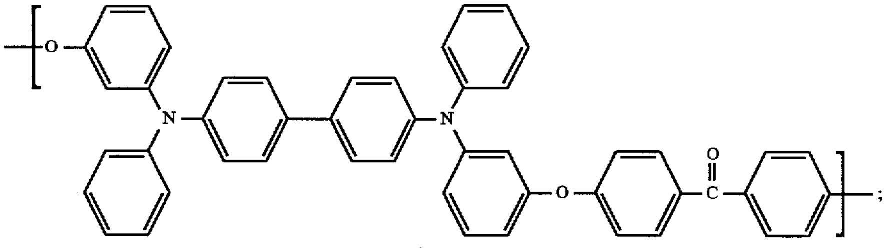
;

-continued

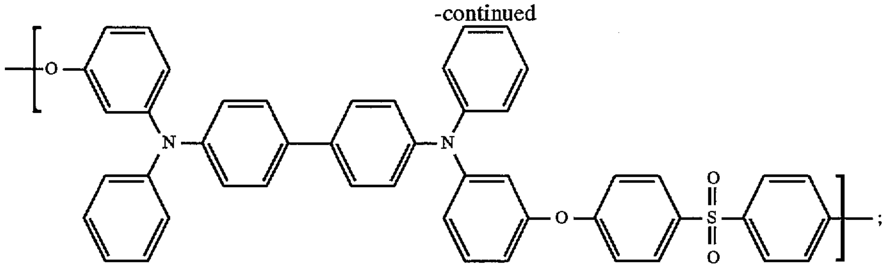

;

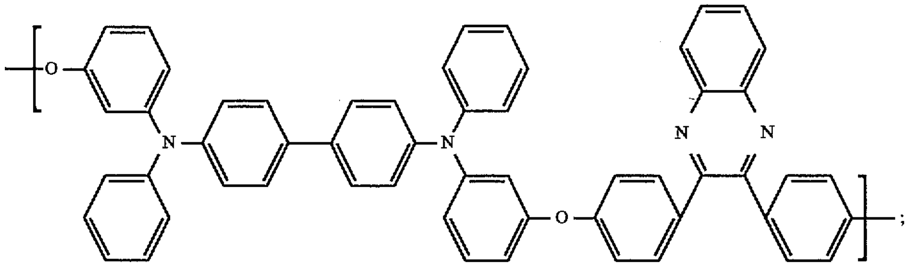

; and

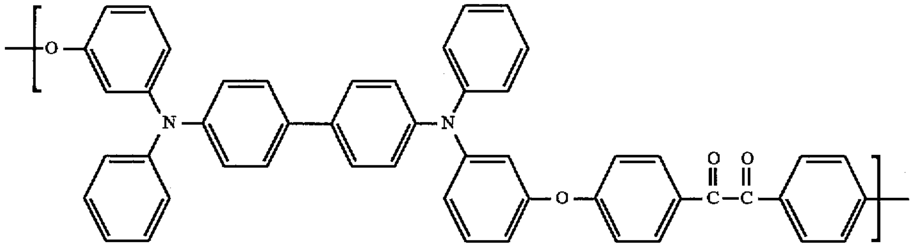

Preferred polymeric tetra-substituted biphenyldiamines are the polymeric reaction products of N,N'-diphenyl-N,N'-bis(3-hydroxyphenyl)1,1'-biphenyl-4,4'-diamine (HPBD),

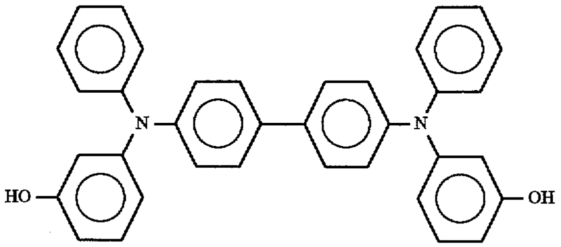

with any of the following: bisphenol-A-bischloroformate,

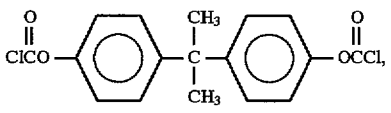

ethyleneglycol bischloroformate,

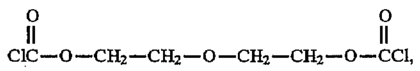

diethyleneglycol bischloroformate,

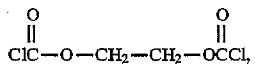

adipoylchloride,

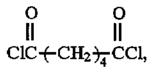

suberoylchloride,

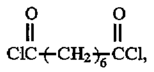

sebacoylchloride,

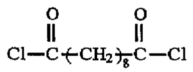

and siloxane based HPBD polymers,

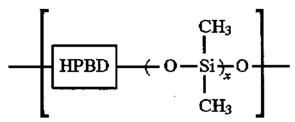

where x = 1–6.

The electron transport layer 5 is comprised of electron transport materials such as those disclosed by Tang et al., column 6, line 54–column 9, line 15. Examples of the suitable materials include diarylbutadienes, stilbenes, optical brighteners and metal chelated oxinoid compounds including chelates of oxine. A preferred electron transport material is 2-(4-biphenyl)-5-(4-tert-butylphenyl)-1,3,4-oxadiazole. These materials can be deposited by vacuum evaporation as also disclosed by Tang et al.

The polymeric tetraaryl-substituted biphenyl diamine can be a hole transport material. However, it has been found that a polymeric tetraaryl-substituted biphenyl diamine has the ability to transport electrons when the polymer contains an electron transport moiety such as the nitrogen containing compounds disclosed as suitable for G and EWG above. Also, the tetraaryl-substituted biphenyl diamine can be blended with a conjugated polymer such as phenyl-substituted poly(phenylene vinylene) (PPV) to provide a single organic layer EL device having superior electroluminescent properties. In this embodiment, emitter layer 7 comprises an arylamine containing polymer and the n-conjugated polymer that constitute the electro-optically active portion of the EL device. The layer 7 comprises a blend of polymeric tetraaryl-substituted biphenyl diamine with the conjugated polymer. Suitable nonconjugated polymers include electroactive n-conjugated polymers comprising the derivatives of poly(p-phenylene vinylene), and preferably poly(2-phenyl-1,4-phenylene vinylene), poly(1,4-phenylene-1'2"-diphenyl vinylene), poly(1,4-phenylene-1'-phenyl vinylene), and cyano substituted poly(arylene vinylene) as reported by N. C. Greenham et al. in Nature, 365, 628 (1993) of the structures indicated below and mixtures thereof.

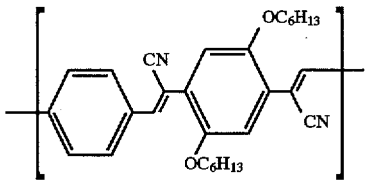

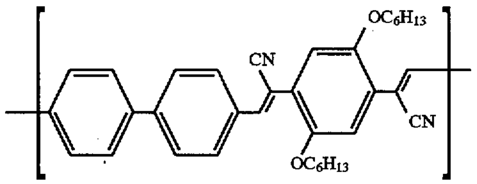

The emitter is present in an amount of 0.01 to about 5 wt.% and preferably from about 0.1 to about 1 wt.% of the host polymer or polymers. Examples of emitters or fluorescent dyes are illustrated by Tang et al. and include known compounds selected for this purpose, such as coumarin dyes, such as 7-diethylamino-4-methylcoumarin, 4,6-dimethyl-7-ethylaminocoumarin, 4-methylumbelliferone, and the like, fluorescent 4-dicyanomethylene-4H-pyrans, such as 4-(dicyanomethlene)2-methyl-6-(p-dimethylaminostyryl)-4H-pyran and the like, polymethine dyes such as cyanines, merocyanines, complex cyanines and merocyanines, oxonals, hexioxonols, styryls, merostyryls, streptocyanines and the like.

The weight ratio of the hole transport polymer to the electron transport compound is from about 100:1 to 1:2 and preferably 10:1 to 1:1. The thickness of the active layer can typically be from about 100 to 5,000 Å, and preferably from about 300 to about 2,000 Å.

The cathode 6 is conveniently formed by deposition on the upper layer of the hole transport/emitting layer 5. Cathode 6 is preferably comprised of magnesium, calcium, or aluminum. The cathode 6 is of a thickness of for example from about 10 to 5,000 A. The cathode 6 can be constructed of any metal including any-low work function metal useful for this purpose. The cathode can also be formed from a combination of a low work function metal and at least one other metal. A low work function metal is a metal having a work function of less than 4 eV. The lower the work function of the metal, the lower the voltage required for electron injection into layer 5 or 7.

Suitable low work function metals include metals of Group 2A or alkaline earth metals, Group III metals including rare earth metals and the actinide groups and metals. Alkaline earth metals are preferred because of their ready availability, low cost, ease of handling and minimal adverse environmental impact. Magnesium and calcium are particularly preferred. Low work function metals exhibiting work functions in the range of 3.0 to 4.0 eV are usually more stable than metals exhibiting lower work functions and are, therefore, preferred.

The cathode 6 may include a second metal for the purpose of increasing stability both during storage and operation. The second metal can be chosen from any metal other than alkaline metal. The second metal itself can be a low work function metal and suitable examples of the second metal include the examples of metals for the first metal having a work function of less than 4 eV.

As an alternative, the second metal can be chosen from various metals having a work function greater than 4 eV. This group includes elements more resistant to oxidation and therefore more commonly fabricated as metallic elements. The second metal contributes to the stability of cathode 6.

Suitable metals having a work function of 4 eV or greater include aluminum, the Group 1B metals, metals in Groups IV, V and VI and the Group VIII transition metals particularly noble metals. Aluminum, copper, silver, gold, tin, led, bismuth, tellurium and antimony are particularly preferred high work function second metals for incorporation into cathode 6.

A primary function of the second metal is to stabilize the first, low work function metal. A second function is to reduce sheet resistance of the cathode 6 as a function of the thickness of the cathode. This results in a highly stable, thin, transparent cathode 6 of acceptably low resistance level and high electron injection efficiency. A third function of the second metal is to facilitate vacuum vapor deposition of the first metal.

Suitable proportions of second metal to first metal are in the range of 100:1 to 1:100 of the total metal component of cathode 6. Additional suitable cathode constructions and suitable metals for the cathodes and functions of the metals are described by Tang et al.

Both anode 3 and cathode 6 of the organic EL device can take any convenient form. A thin conductive layer can be coated onto a light transmissive substrate, for example, a transparent or substantially transparent glass plate or plastic film. The EL device can include a light transmissive anode 3 formed of tin oxide or indium tin oxide coated on a glass plate. Also, very thin light-transparent metallic anodes can be used, such as gold etc. In addition, transparent or semi-transparent thin layers of n-conjugated polymers such as polyaniline, polypyrrole, etc can be used as anodes. Any light transmissive polymeric film can be employed as the substrate. Further suitable forms of the anode 3 and cathode 6 are illustrated by Tang et al.

Some preferred embodiments have been described above with reference to FIGS. 1 and 2. FIG. 2 comprises a single active hole-electron transport/emitter layer 7. While the single active hole-electron transport/emitter layer embodiments are preferred because of the advantages obtained with an EL device comprising a single active organic layer, the present invention encompasses multiple organic layer EL devices as exemplified by FIG. 1 as well. The multiple organic layer devices can comprise the polymer of tetraaryl-substituted biphenyl diamine as a hole transport polymer that can be present in a layer between the electrode and a layer containing electron transport material as shown in FIG. 1.

In embodiments, the device of the present invention can be prepared to electroluminesce at wavelengths longer than the intrinsic luminescence of the polymeric tetraaryl-substituted biphenyl diamine by doping with small effective amounts, for example from about 0.1 to about 5 weight percent, of fluorescent organic molecules, such as those as illustrated by Tang et al. Another advantage of the device of the present invention as compared to insoluble hole transport material devices that cannot be formed by solution coating is that the emission of the polymeric tetraaryl substituted biphenyl diamine can be altered to change band gap by doping. The polymer of a tetraaryl-substituted biphenyl diamine illustrated herein with respect to the present invention can be doped with fluorescent organic dyes, like laser dyes to enable electroluminescence at wavelengths longer than the emission intrinsic to the polymer of an tetraaryl-substituted biphenyl diamine.

In one embodiment, the devices of the present invention are considered solution coated single layer devices wherein the hole transport polymer, the electron transport compound and the emitter are contained in a single layer as indicated herein. These devices can generally be prepared as follows. An indium-tin oxide-coated glass plate of the type usually known as NESA® glass is cleaned first by washing in an ultrasonic bath with a detergent, rinsed in deionized water, then exposed to concentrated sulfuric acid containing "No chromix®" oxidant, rinsed again in de-ionized water, then cleaned in an ultrasonic bath with ethanol, dried at 100° C. and exposed to ozone in a chamber for 15 minutes. A solution of 200 mg of a copolymer prepared by polycondensation of N,N'-diphenyl-N,N'-bis(3-hydroxyphenyl)-1,1'-[biphenyl]-4,4'-diamine (dihydroxy-TPD) with ethyleneglycol bischloro-formate, 100 mg of 2-(4-biphenyl)-5-(t-butylphenyl)-1,3,4-oxadiazole (Bu-PBD) and 0.4 mg of the emitter, Coumarin 6, in 10 ml of chlorobenzene, filtered through a glass fiber filter (0.4 μ), is spin-coated onto the above substrate. The spinning rate is 1000 revolutions per minute. The resulting film is about 1500 Å thick. Then, an approximately 150 Å thick layer of Mg is vapor-deposited on top of the above layer in a Denton DV-502A high vacuum evaporator at a base pressure of $2\times10^{-7}$ Torr. The Mg electrode is then overcoated, without breaking the vacuum, with an approximately 100 Å thick layer of Ag, for the purpose of protecting the reactive Mg from the ambient moisture. The device is inserted in a circuit where the voltage is supplied by a Hewlett-Packard 214B pulse generator. Luminance is measured with a calibrated silicon photovoltaic detector. At an applied voltage of 35 V, the device emitted bright green light with the luminance of about 1000 cd/m$^2$.

Additionally in embodiments, the present invention is directed to organic solid state EL devices comprised of a supporting substrate as illustrated herein, such as glass, a semitransparent layer of for example indium or tin oxide, an active single layer comprised of a polymer of an aryl tetra-substituted diamine, an emitter compound, an electron transport compound and a low work function electrode as the top layer The following Examples are provided to further define various species of the present invention, it being noted that these Examples are intended to illustrate and not limit the scope of the present invention. Parts and percentages are by weight unless otherwise indicated.

EXAMPLE 1

An indium-tin oxide-coated glass plate of the type usually known as NESA® Glass was cleaned first by washing in an ultrasonic bath with a detergent for approximately 10 minutes, rinsed in running deionized water, then dipped 16 times for periods of 6 sec. intoto concentrated sulfuric acid containg "No chromix®" oxidant, then rinsed again in running de-ionized water, then cleaned in an ultrasonic bath with 100% ethanol at 50° C. for about 10 minutes and then dipped into a bath with boiling 100% ethanol for 10 minutes. The substrate was then dried and stored in a clean convection oven (in a Class 100 clean room) at 100° C. Immediately before use, the substrate was exposed to ozone in an ozone chamber for 15 minutes. A solution of 200 mg of a copolymer prepared by polycondensation of N,N'-diphenyl-N,N'-bis(3-hydroxyphenyl)-1,1'[biphenyl]-4,4'-diamine with ethyleneglycol bischloro-formate, 100 mg of 2-(4-biphenyl)-5-(t-butylphenyl)-1,3,4-oxadiazole (Bu-PBD) and 0.4 mg of the emitter, Coumarin 6, in 10 ml of chlorobenzene, filtered through a glass fiber filter (0.4 μ) and a polypropylene filter, was spin-coated onto the substrate. The spinning rate was 1000 revolutions per minute. After drying, first in air and then in the vacuum chamber for about 3 hrs, the resulting film thickness was determined to be about 1500 μ. Then, an approximately 150 μ. thick layer of Mg was vapor-deposited through a mask with round holes 4 mm in diameter on top of the above layer in a Denton DV-502A high vacuum evaporator at a base pressure of $2\times10^{-7}$ Torr. The Mg electrode was then overcoated, without breaking the vacuum, with an approximately 100 μ. thick layer of Ag, for the purpose of protecting the reactive Mg from the ambient moisture. The device was then mounted in a sample box and fitted with pressure contacts. The voltage was supplied by a Hewlett-Packard 214B pulse generator. The device was operated using 100 μ pulse width at a 10% duty cycle. The current was measured using a Tektronix 7904 oscilloscope with a Tektronix 7A19 amplifier. Luminance was measured with a calibrated silicon photovoltaic detector. At an applied voltage of 35 V, the device emitted bright green light with the peak at 495 nm with the luminance of about 2,000 cd/m.

EXAMPLE 2

On an indium-tin oxide covered glass plate cleaned and treated as in Example 1, was spin-coated a solution of 200 mg of a copolymer prepared by polycondensation of N,N'-diphenyl-N,N'-bis(3-hydroxyphenyl)-1,1'-[biphenyl]-4,4'-diamine with 1,5-dichlorohexamethyltrisiloxane, 100 mg of 2-(4-biphenyl)-5-(t-butylphenyl)-1,3,4-oxadiazole (Bu-PBD) and 0.3 mg of the emitter, 4-(dicyanomethylene)-2-methyl-6-(p-dimethylaminostyryl)-4-H-pyran in 10 ml chlorobenzene filtered through a 0.4 μ glass fiber filter and a polypropylene fiber. The film thickness was about 1200 Å. The cathode made of magnesium overcoated with silver was deposited as in Example 1. The device emitted bright yellow-green light with the peak emission at 558 nm with luminance of about 1500 cd/m$^2$ at the applied voltage of 25 V.

EXAMPLE 3

An indium-tin oxide substrate from Example 1 was overcoated by spin-coating technique with a solution of 200 mg of a copolymer prepared by polycondensation of N,N'-diphenyl-N,N'-bis(3-hydroxyphenyl)-1,1'-[biphenyl]-4,4'-diamine with sebacoylchloride, 100 mg of 2-(4-biphenyl)-5-(t-butylphenyl)-1,3,4-oxadiazole (Bu-PBD) and 0.25 mg of Sulforhodamine 101 in 10 ml. of chlorobenzene. The cathode made of magnesium overcoated with silver was deposited as in Example 1. The device emitted red light with the emission maximum at 603 nm with luminance of about 500 cd/$m^2$ at the applied voltage of 25 V.

EXAMPLE 4

An indium-tin oxide substrate from Example 1 was overcoated by spin-coating technique with a solution of 150 mg of a copolymer prepared by polycondensation of N,N'-diphenyl-N,N'-bis(3-hydroxyphenyl)-1,1'-[biphenyl]-4,4'-diamine with 1,5-dichlorohexamethyltrisiloxane, 150 mg of poly(1,4-phenylene-1'2"-diphenyl vinylerie, and 3 mg of Sulforhodamine B in 10 ml of chlorobenzene. The cathode made of magnesium overcoated with silver was deposited as in Example 1. The device emitted orange light with the emission maximum at 581 nm nm with luminance of about 800 cd/$m^2$ at the applied voltage of 20 V.

Other modifications of the present invention will occur to those skilled in the art subsequent to a review of the present application. These modifications and equivalents thereof are intended to be included within the scope of this invention.

What is claimed is:

1. An electroluminescent device comprising a support substrate, a hole injecting electrode an active layer and an electron injecting electrode wherein the active layer comprises a polymer of a tetraaryl-substituted biphenyldiamine, wherein the polymer of tetraaryl-substituted biphenyldiamine is (A) a copolymer of N,N'-diphenyl-N,N'-bis(3-hydroxyphenyl)-1,1'-biphenyl-4,4'-diamine or N,N'-diphenyl-N,N'-bis(4-hydroxyphenyl)-1,1'-biphenyl-4,4'-diamine with a member selected from the group consisting of bisphenyl)A-bischloroformate, ethyleneglycol bischloroformate, diethyleneglycol bischloroformate, adipoylchloride, suberoylchloride and sebacoylchloride or (B) a siloxane N,N'-diphenyl-N,N'-bis(3-hydroxyphenyl)-1,1'-biphenyl-4,4'-diamine polymer or siloxane N,N'-diphenyl-N,N'-bis(4-hydroxyphenyl)-1,1'-biphenyl-4,4'-diamine polymer.

2. The electroluminescent device of claim 1 wherein the polymer of a tetraaryl-substituted biphenyldiamine is present as a hole transport polymer.

3. The electroluminescent device of claim 1, additionally comprising an electron transporting material.

4. The electroluminescent device of claim 3, wherein the electron transporting material is 2-(4-biphenyl)-5-(4-tert-butylphenyl)-1,3,4-oxadiazole.

5. The electroluminescent device of claim 1, wherein said active layer is obtained by a solution coating method and is comprised of an emitter and the polymeric tetraaryl substituted biphenyldiamine as a hole transport polymer.

6. The electroluminescent device of claim 5, wherein the substrate is comprised of a polymer, a metal, a semiconductor or glass.

7. The electroluminescent device of claim 5, wherein the hole injecting electrode is comprised of indium tin oxide.

8. The electroluminescent device of claim 5, wherein the emitter for said active layer is comprised of a coumarin dye or a polymethine dye.

9. The electroluminescent device of claim 5, further comprising a protective coating coated over said electron injecting electrode.

10. The electroluminescent device of claim 5, further comprising a top overcoating.

11. The electroluminescent device of claim 10, wherein the top overcoating is glass.

12. An electroluminescent device, comprising a hole injecting electrode, an active layer and an electron injecting electrode, wherein the active layer comprises a blend of a polymeric tetraaryl-substituted biphenyldiamine and a phenyl substituted poly (p-phenylene vinylene).

13. The electroluminescent device of claim 12, wherein the phenyl substituted poly(p-phenylene vinylene) is poly (2-phenyl 1,4-phenylene vinylene), poly(1,4-phenylene-1'2"-diphenyl vinylene), poly(1,4-phenylene-1'-phenyl vinylene),

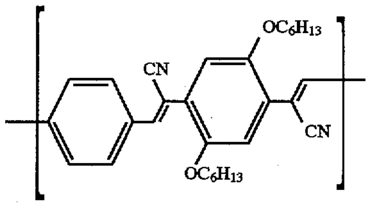

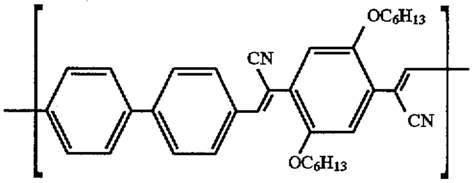

or mixtures thereof.

14. An electroluminescent device comprising a support substrate, a hole injecting electrode, an active layer and an electron injecting electrode, wherein the active layer comprises a polycarbonate, a polyester, a polyarylene ether or a polysiloxane of the following formulae:

Poly(carbonate):

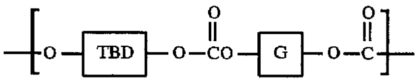

Poly(ester):

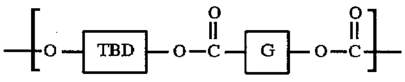

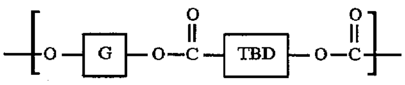

-continued
Polysiloxane:
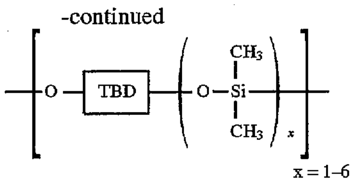
x = 1–6
Poly(arylene ether):
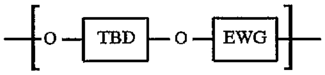
wherein TBD is a tetraaryl substituted biphenyldiamine moiety; G is a hydrocarbon group or a heterocyclic group and EWG is an aromatic group containing electron withdrawing groups.
15. The electroluminescent device of claim 14 wherein G, the hydrocarbon group or heterocyclic group is:
$-(CH_2)n-$, (n=1–10); $-(CH_2CH_aO)n-$, (n=1–6);
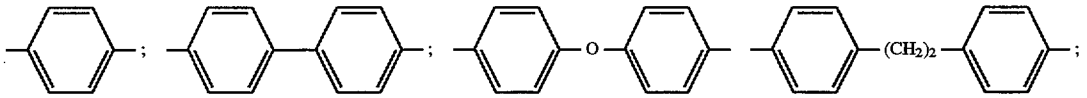
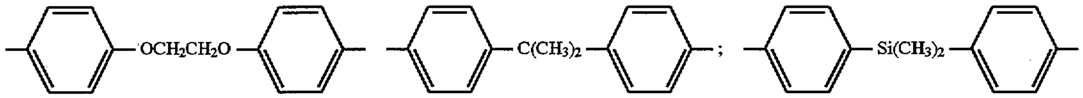
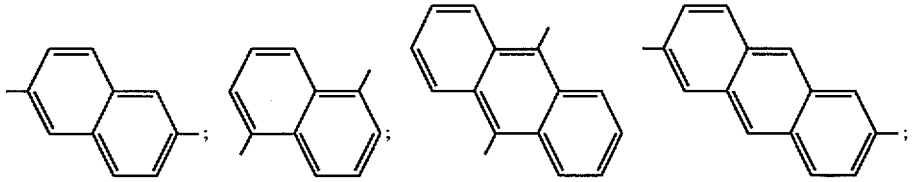
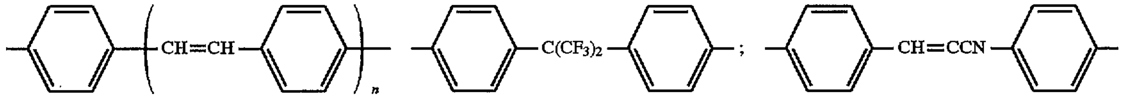
n = 1–3
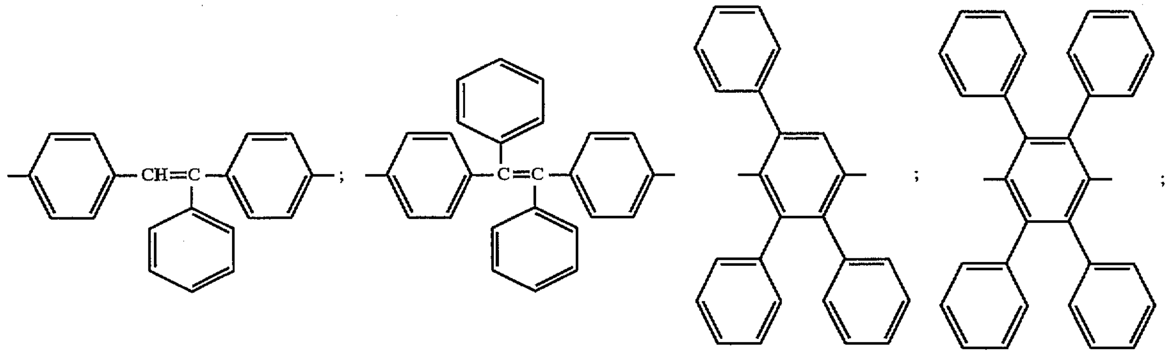

-continued
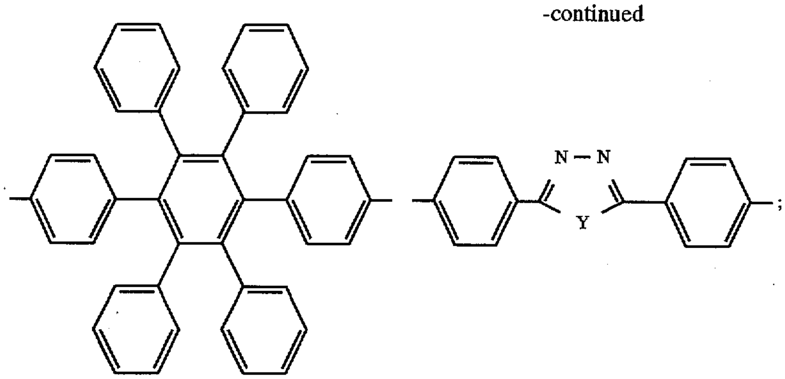
;
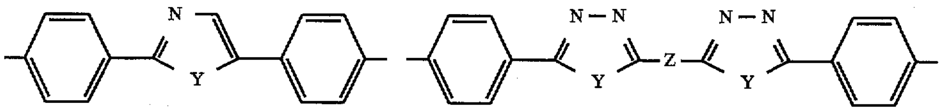
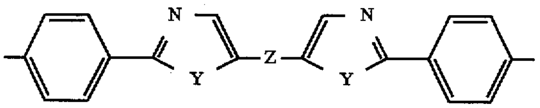
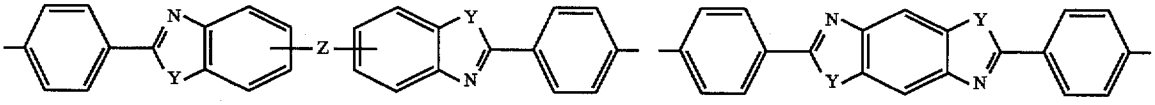
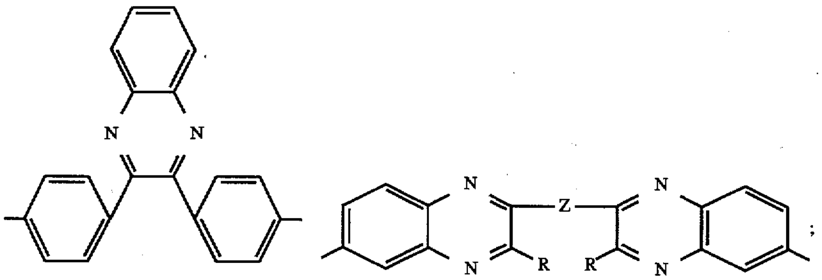
; or
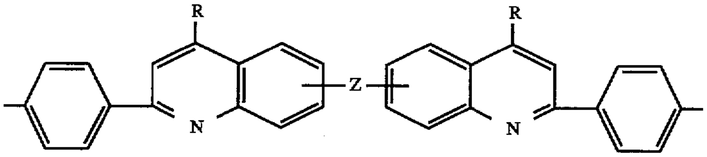
where R=Phenyl or alkyl groups; Y=S, O, N–R(R=alkyl, or phenyl); and Z=alkyl or phenylene.
16. The electroluminescent device of claim 14, wherein EWG, is:
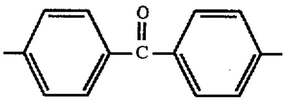
;
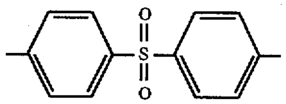
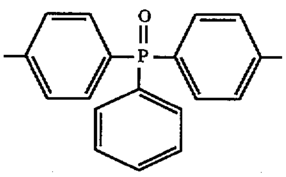
;

-continued

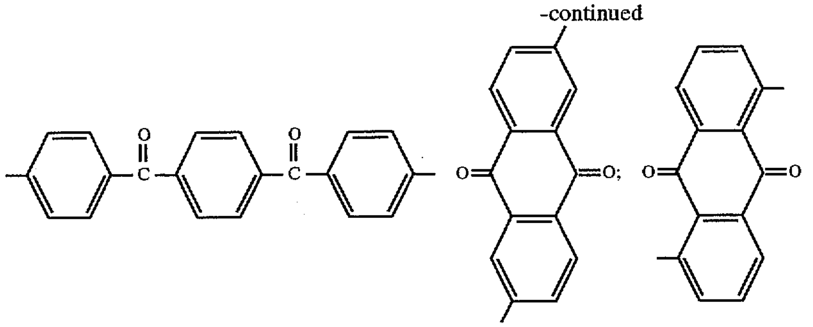

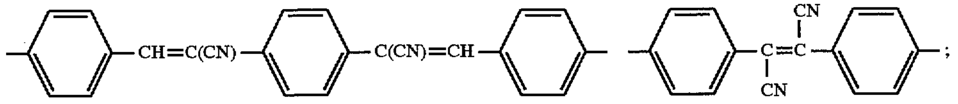

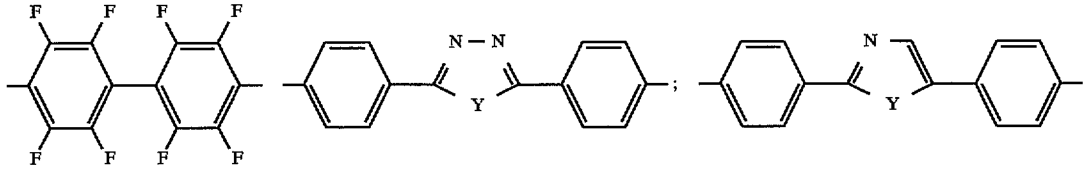

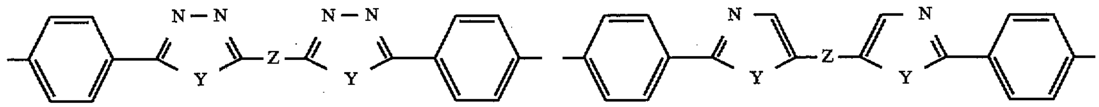

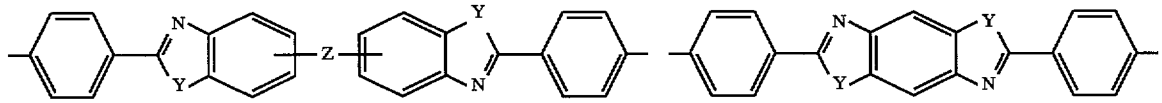

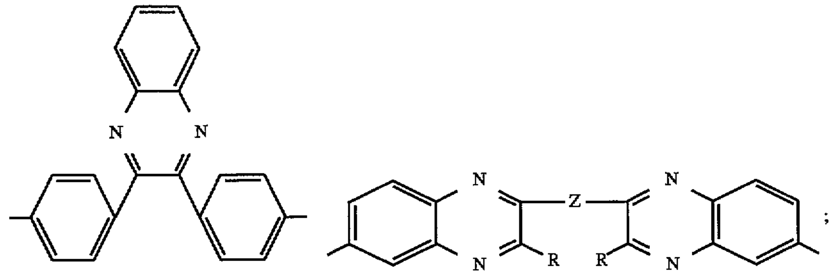

; or

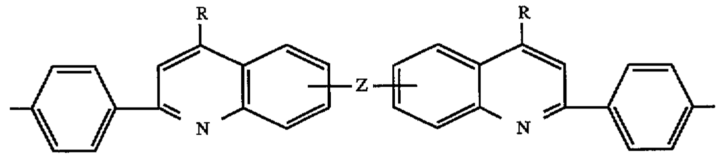

where R=Phenyl or alkyl groups; Y=S, O, N–R (R=alkyl, or phenyl); and Z=alkyl or phenylene.

17. A method of manufacture of an electroluminescent device, comprising forming an active layer with supporting substrate, hole injecting electrode and electron injecting electrode, comprising depositing onto a substrate by solution coating, a layer of (A) a tetraaryl-substituted biphenyl diamine copolymer of N,N'-diphenyl-N,N'-bis(3-hydroxyphenyl)1,1'-biphenyl-4,4'-diamine or N,N'-diphenyl-N,N'-bis(4-hydroxyphenyl)-1,1'-biphenyl-4,4'-diamine with a member selected from the group consisting of bisphenol -A-bischloroformate, ethyleneglycol bischloroformate, diethyleneglycol bischloroformate, adipoylchloride, suberoylchloride and sebacoylchloride or (B) a siloxane [based] N,N'-diphenyl-N,N'-bis(3-hydroxyphenyl)-1,1'-biphenyl-4,4'-diamine polymer or siloxane N,N'-diphenyl-N,N'-bis(4-hydroxyphenyl)-1,1'-biphenyl-4,4'-diamine polymer.

18. The method of claim 17, comprising depositing the layer by spin-coating.

* * * * *